Patented Dec. 14, 1937

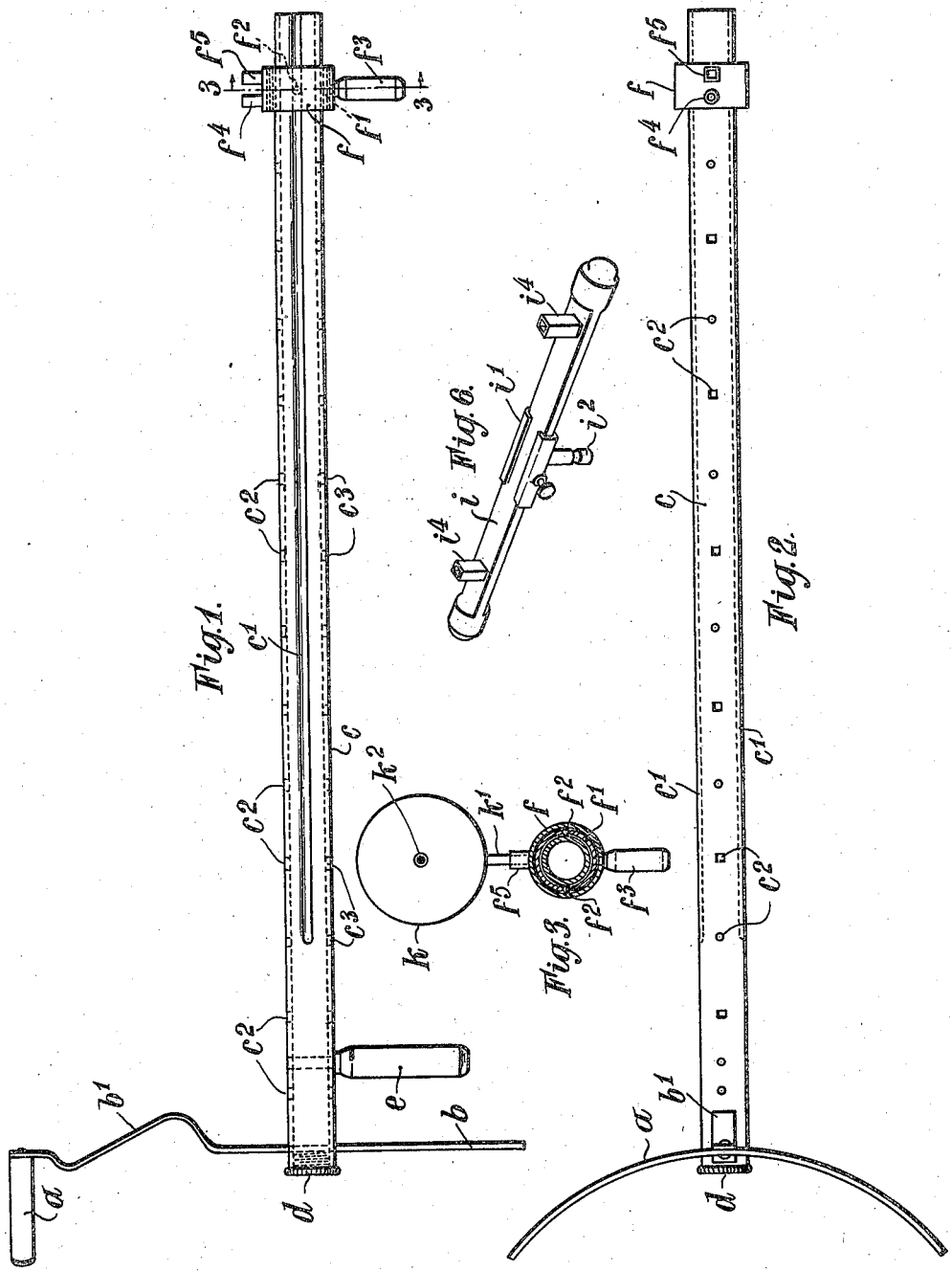

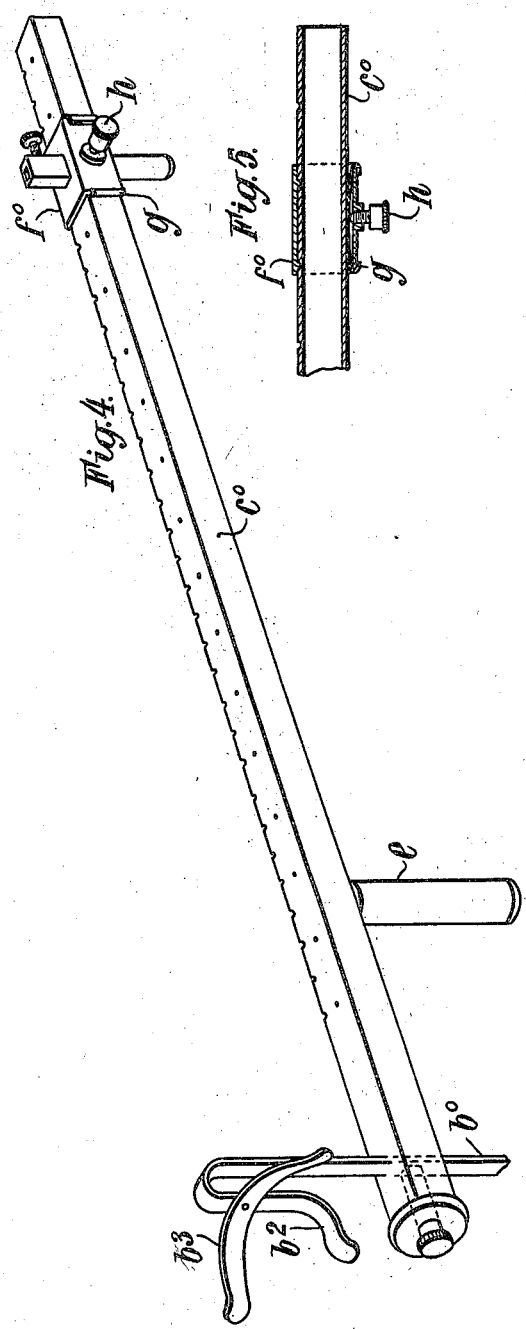

2,102,490

UNITED STATES PATENT OFFICE 2,102,490

MEANS FOR INVESTIGATING, CORRECTING, AND DEVELOPING THE POWER OF HUMAN VISION

Robert Brooks Simpkins, Edgbaston, Birmingham, England

Application September 4, 1934, Serial No. 742,678
In Great Britain September 6, 1933

2 Claims. (Cl. 88—20)

This invention has reference to an improved means for investigating, correcting and developing the power of human vision.

It has been found by intensive research that defects of human vision are due, generally speaking, more to the poor or non-operation of some, or a group, of the muscles controlling the functioning of an eye rather than to organic weakness and that although the weakness can be mitigated for ordinary practical purposes by the use of lenses such treatment tends to over-accentuate what is really not a defect of the actual organ of sight but merely a weakness of the musclar energy controlling the organ. As a consequence of his experiments the inventor has discovered that many common weaknesses of vision attributable to failure, or partial failure, of the functioning of the muscles of the eye can be rectified by engaging the eye in exercises which are mainly directed to the exercising of the particular muscles which are wholly or partially failing, and the present invention has for its object the provision of an improved apparatus for investigating, correcting and developing the power of human vision by the employment of means for enabling the eye to be examined and subsequently exercised in such a manner as to develop the use of any desired muscle or group of muscles of the eye which may be found to be weak by the said examination.

The apparatus comprises means, designed with special regard to the normal binocular focus of human vision, whereon various appliances designed for investigation, correction and development of the vision are adapted to be mounted for operation in the practice of the invention.

My invention will be further and more particularly described with reference to the accompanying drawings which illustrate convenient constructions or embodiments of the apparatus or appliances designed for carrying the invention into effect.

Figure 1 represents in side elevation one form of the appliance whereon the various other appliances are adapted to be mounted for operation, the said appliance for convenience and simplification of reference being hereinafter referred to as "the mount".

Figure 2 is a plan of the same, and

Figure 3 is a transverse section on the plane indicated by the dotted line 3—3, Figure 1; one of the appliances hereinafter more particularly described being shown in this figure.

Figure 4 is a perspective view illustrating modifications in the construction of the mount.

Figure 5 shows a fragmental part of Figure 4 in section.

Figure 6 is a perspective view of an adapter or turntable for the carrier.

The mount is designed to ensure that the various appliances used in conjunction therewith are supported in, or approximately in, the plane to which the imaginary visual lines converge at all distances in normal binocular vision, and in the construction represented in Figures 1, 2 and 3 comprises a horizontally disposed band $a$ adapted to take or fit against the forehead of the person using the apparatus, the said band being secured to the upper end of a vertical strip $b$ so bent as to conform to the shape of the human face from the forehead to the mouth, that is to say, the said strip has a part $b^1$ between its connection with the band $a$ and its lower end, which serves to accommodate and lie against the nose.

The depending lower part of the said strip $b$, which is preferably graduated in inches or in any desired fractions thereof, is adapted to be secured to the rear end of a tubular member $c$ disposed horizontally in the plane of the strip, a convenient form of connection being afforded by the provision of a vertical slot in the tube $c$ in which slot the strip is adapted to slide and be adjustably secured by a clamping screw such as $d$.

The tube $c$ is furnished with a depending rod or handle $e$ whereby the mount is held in position against the face when in use.

The said tube $c$ is provided in its outer periphery with longitudinally extending grooves $c^1$ which are disposed on opposite sides of the tube and in the plane of the horizontal diameter.

These grooves $c^1$ which form guides for the carrier device hereinafter described, terminate within a distance of approximately 3 inches from the face strip $b$, thereby preventing appliances mounted on the carrier from being brought within closer range than this approximate distance, since generally speaking both normal and defective eyes are incapable of operation at closer range, and three inches is regarded as the safety mark for viewing microscopic or very small objects or print.

Concentrically disposed about the said tube $c$ is an annular carrier $f$ provided with a ball-race $f^1$ the bearings $f^2$ whereof engage in the grooves $c^1$ in the tube $c$ and give the said carrier $f$ a substantially frictionless movement on the tube. The annular carrier has secured to the underside thereof a vertically disposed handle $f^3$ which serves to facilitate the movement of the carrier on the tube. The upper portion of the carrier is provided with two upwardly projecting sockets $f^4$, $f^5$ one of which is interiorly of a circular shape in cross section and the other of a rectangular configuration. This carrier serves to receive the pieces of apparatus designed for testing the vision and for carrying out the various exercises which have been devised for overcoming weakness or defectiveness of vision. The tube $c$ is graduated for example, in inches or in any desired fractions thereof so as to enable the position of the carrier to be determined and to enable the patient to obtain an indication of the progress made in the endeavour to rectify his powers of vision.

I wish it to be understood that I do not limit myself to the particular construction of the parts of the mount described as the same may be varied if desired. For example I may provide in lieu of the bands $a$ and $b$ which serve to locate the mount against the face as hereinbefore described, the face locating means illustrated in Figure 4. In this modification the vertical strap $b^o$ is formed at its upper end with a part $b^2$ adapted to be located below the chin and a horizontal or laterally extending band $b^3$ which is adapted to lie against the front of the chin in the neighbourhood of the lower lip.

Further, as is illustrated in the said Figure 4 the member $c^o$ may be square or rectangular in cross section, the carrier $f^o$ being correspondingly shaped and preferably affording sufficient clearance at one side to permit the insertion of a plate spring $g$ which when the carrier has been adjusted to the requisite position on the member $c^o$ is brought to bear thereagainst by a set pin $h$ as will be best appreciated by reference to Figure 5.

If desired the tubular member $c$ of the mount may have therein a series of opposed and preferably equidistantly spaced apart holes arranged on the vertical plane containing the longitudinal axis of the said member, as shown in Figures 1 and 2, these holes, which are denoted by the references $c^2$, $c^3$ in the said figures, co-acting to receive the stems of the appliances to be used with the mount, thus permitting the appliances to be mounted directly on the member $c$ instead of on a sliding carrier, and the said holes may be alternately circular and square in shape.

Further, where the mount is constructed for professional use it may be supported otherwise than by hand as for example on a standard, in which case the handle $e$ may be replaced by a depending rod capable of telescopic adjustment in the standard.

In order to provide for the support on the carrier $f$ of any appliance which it is required shall have a radial movement an adaptor or turntable is provided, a convenient embodiment of such device being shown in perspective in Figure 6, and comprising a bar $i$ mounted and adapted for a sliding adjustment in a guide $i^1$ furnished with a depending stem $i^2$ for mounting the said guide rotatably in a socket of the carrier $f$. The bar $i$ carries upwardly projecting sockets $i^4$ to receive the stems of the appliances to be mounted thereon, the bar $i$ being slidably adjustable in the guide $i^1$.

By the use of the adaptor provision is made not only for a radial movement of the appliance or appliances mounted thereon, but also for a traversing of the appliance, or appliances, across the field of vision and further the said device permits appliances to be opposed to both eyes together with the optical axes parallel.

An example of a suitable appliance for ascertaining the focal point of the eyes and for developing the faculty of rapid focusing is shown in situ, on the mount in the sectional view Figure 3, and comprises a circular disc $k$ furnished with a stem $k^1$ which may be fitted plug-wise in the socket of the carrier $f$ on the bar $c$ of the mount, or directly into one or other of the pairs of holes in the bar $c$. The said disc has a focal spot $k^2$ in the centre thereof, said spot comprising an outer black ring, an inner white ring and at the centre the actual focal point, which is black.

The focal spot may be painted or otherwise produced in colour on the disc.

By the employment of this focal disc in conjunction with the mount the user may ascertain the distance at which the focal point is seen with visual acuity and compare this with normal standards and by traversing the disc on the mount and concentrating the eyes thereon when at varying distances the user may improve the group of muscles controlling the eyes and develop visual acuity to and beyond normal standards.

Although in the description hereinbefore given reference has been more particularly made to the use of appliances for binocular investigation and exercises it will be appreciated that in necessary cases as for example the correction of squints or where the primary investigation so dictates, appliances may be used with equal efficiency for monocular exercises, one or other of the eyes being covered by a shield or the like during the performance of exercises by the other eye.

The mount and the various appliances used in conjunction therewith may conveniently be constructed wholly of metal, but other suitable materials may be employed in their construction if desired.

Where the apparatus is intended for home use the various parts thereof are constructed to such scale that the mount and various appliances supported thereon can conveniently and without undue strain be supported and operated by hand, but when intended for use in the laboratory or consulting room the mount and if desired various other parts of the apparatus or appliances may be constructed to a larger scale and provision made as hereinbefore stated for supporting the mount on a standard whereon it may be adjusted to any desired height.

Where reference is made herein to supporting the various appliances "on the mount" it will be appreciated that the said expression also includes the alternatives of supporting them either on the carrier or on the adaptor or turntable which may be used in connection with the mount.

What I claim is:—

1. Apparatus for investigating, correcting and developing the power of human vision, comprising a tube of circular cross-section provided in its outer periphery at diametrically opposite sides with longitudinally extending grooves, positioning means of strip form carried by said tube having vertical and horizontal components conforming in shape to and adapted to fit a part of a patient's face for definitely and accurately locating the tube relatively to the eyes without obstruction of vision, a rod depending from said tube forwardly of said positioning means, and a traversable member on the tube to support a device for detecting an abnormality of vision and onto which patients are encouraged to train the eyes and perform exercises calculated to remedy a detected abnormality, said traversable member having ball bearings adapted to run in the said longitudinal grooves in said tube.

2. Apparatus for investigating, correcting and developing the power of human vision, comprising a rod, positioning means of strip form carried by said rod having vertical and horizontal components conforming in shape to and adapted to fit a part of a patient's face for definitely and accurately locating the rod relatively to the eyes without obstruction of vision, a rod depending from the first mentioned rod forwardly of said positioning means, a traversable member mounted on the first mentioned rod to support a device for detecting an abnormality of vision and onto which patients are encouraged to train the eyes and perform exercises calculated to remedy a detected abnormality, said device embodying a turntable, socket means on the turntable, a bracket adjustably mounting the turntable, and a projection on the bracket to engage the traversable member.

ROBERT BROOKS SIMPKINS.